Patented Feb. 6, 1951

2,540,157

UNITED STATES PATENT OFFICE 2,540,157

TERTIARY ROSIN ALCOHOLS AND METHOD FOR MAKING THE SAME

Harold H. Zeiss, Fairlawn-Radburn, N. J., assignor, by mesne assignments, to Pierce Laboratory, Inc., New York, N. Y., a corporation of New York No Drawing. Application October 26, 1946, Serial No. 706,068

10 Claims. (Cl. 260—97)

This invention is concerned with the production of certain new carbinols, more specifically the tertiary rosin alcohols; and the invention is further concerned with a method for making such tertiary rosin alcohols.

I have found that the above mentioned new compounds are valuable for use as intermediates in making other compounds and also are of value for certain other purposes, such as fungicides and germicides.

Briefly described, the process of the invention contemplates production of tertiary rosin alcohols from rosin acids, by first esterifying the carboxyl group of the selected rosin acid. The ester is then treated with a Grignard reagent to form a magnesium halo-complex with the ester, and the said complex is then hydrolyzed to form the tertiary rosin alcohol.

The process of the invention is applicable generally to the esters of what are herein referred to as rosin acids. The term "rosin acids" as used herein includes the primary or naturally occurring rosin acids, such as abietic acid, dehydroabietic acid, l-pimaric acid and d-pimaric acid, and also acids derived from the primary rosin acids, by hydrogenation, disproportionation and isomerization. For example, dihydroabietic and tetrahydroabietic acids are formed by hydrogenation of abietic acid. As is known, certain of the primary rosin acids may also be converted to the form of other primary rosin acids (for example, abietic acid may be subjected to disproportionation to produce dehydroabietic acid, and abietic acid itself is formed by isomerization of l-pimaric acid) and the invention is also applicable to acids formed in these ways.

Any of such acids may be esterified with an alcohol such as an alkyl alcohol, and the resultant ester may be employed in accordance with the process of the invention in the subsequent reaction with the Grignard reagent. Of especial advantage are the esters formed with methyl alcohol and ethyl alcohol.

The Grignard reagent reacts with the carbonyl group of the ester to form a magnesium halo-complex which, when hydrolyzed forms the tertiary carbinol. Since this characteristic reaction of this invention is concerned with the carbonyl group, it will be seen that the invention is applicable not only to the rosin acid esters above referred to but also to derivatives having substituents introduced either before or after esterification. The groups or classes of derivatives to which the invention is applicable include any in which the substituent or substituents are substantially inert with respect to the Grignard reagent, i. e., they will not react with the reagent to destroy it. For example, any substituent containing acidic hydrogen is excluded. As illustrative of derivatives which can be treated are those where the substituent is an alkoxy group.

Any of the Grignard reagents comprising a magnesium salt of an alkyl or aryl halide may be used, especially magnesium salts or primary alkyl halides and of unsubstituted aryl halides, for instance, methyl magnesium iodide and phenyl magnesium bromide. Grignard reagents especially contemplated for use are the magnesium salts of primary alkyl chlorides, bromides and iodides, and magnesium salts of unsubstituted aryl bromides and iodides. The rosin ester is brought into reaction with the Grignard reagent in ethereal solution, and thereafter the reaction product is hydrolyzed. For purposes of illustration, by following the method just referred to, diphenyl-t-dehydroabietinol may be prepared by reacting either the methyl or the ethyl ester of dehydroabietic acid with phenyl magnesium bromide, the resulting tertiary alcohol conforming with the diagram given just below.

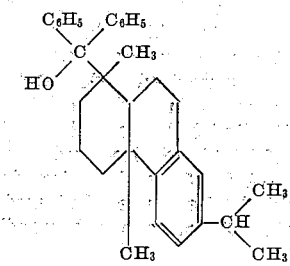

Although variations in treatment technique may be employed in the reaction with the Grignard reagent and in the hydrolyzing, the following examples are illustrative.

EXAMPLES

*Example 1.—Preparation of dimethyl-t-dehydroabietinol*

A solution of 20 g. of methyl dehydroabietate in 40 ml. of dry ether was added to a solution of phenylmagnesium bromide, prepared from 3.5 g. of magnesium and 21.4 g. of methyl iodide, in 60 ml. of dry ether. The mixture was refluxed for 4 hours after which it was cooled in an ice bath and hydrolyzed with 200 ml. of 20% aqueous ammonium chloride solution. The aqueous layer was removed and the ether washed free of halide ion. The ethereal solution was dried over sodium sulfate and the ether evaporated leaving a yellow, viscous oil. This is the crude carbinol.

*Example 2.—Preparation of diphenyl-t-dehydroabietinol*

A solution of 38 g. of methyl dehydroabietate in 100 ml. of dry ether was added to a refluxing ethereal solution of phenylmagnesium bromide (prepared from 7 g. of magnesium turnings and 43 g. of bromobenzene in 200 ml. of dry ether). The procedure was the same as given above for the dimethyl carbinol except that hydrolysis was carried out with 10% sulfuric acid and that after extraction of the crude diphenyl carbinol with ether, the ether was removed and the residue was steam distilled to remove diphenyl. The mass was next dried in ether over sodium sulfate.

*Example 3.—Preparation of diphenyl-t-dehydroabietinol*

10 g. of ethyl ester of dehydroabietic acid in 15 ml. of dry ethyl ether was added to a refluxing solution of 13.4 g. of phenylmagnesium bromide in 50 ml. of dry ether and the solution refluxed for 2 hours. The ether was then distilled off and the residue heated further for 2 hours on a steam bath, and then cooled in an ice bath. The residue was redissolved in 75 ml. of ether and poured, with stirring, into 50 ml. of a 10% aqueous solution of $H_2SO_4$, in the presence of 25 g. of ice. After settling and separation, the ether layer was washed with about 200 ml. of 10% aqueous $H_2SO_4$, and then with water until neutral. After distilling the ether the residue was steam distilled to remove diphenyl.

*Example 4.—Preparation of diphenyl-t-abietinol*

3.56 g. of magnesium and 25.1 g. of bromobenzene were reacted in 75 ml. of dry ether to which a solution of 21.2 g. of methyl abietate in 25 ml. of dry ether was added. The ester and the phenylmagnesium bromide were refluxed for 2 hours after which the ether was removed and the viscous residue heated on a steam bath for an additional 2 hours. The mass was cooled in an ice bath, then covered with a layer of ether and 150 ml. of 10% sulfuric acid added to hydrolyze the complex. The aqueous layer was removed and the ether solution washed with water to neutrality. After evaporation of the ether, the residue was steam distilled to remove the diphenyl, leaving 25.2 g. (85.5%) of the crude carbinol as a pale yellow solid. Crystallization from methyl alcohol yielded the pure diphenyl-t-abietinol in the form of transparent needles; M. P. 158°–159° C.

I claim:

1. A member of the group consisting of the tertiary rosin alcohols of which the rosin nucleus is that of an unmodified primary rosin acid, and of which the alcoholic substituent contains two groups selected from the class consisting of lower alkyl and aryl groups.

2. A member of the group consisting of the tertiary rosin alcohols of which the rosin nucleus is that of an unmodified primary rosin acid, and of which the alcoholic substituent contains two unsubstituted aryl groups.

3. A member of the group consisting of the tertiary rosin alcohols of which the rosin nucleus is that of an unmodified primary rosin acid, and of which the alcoholic substituent contains two primary alkyl groups.

4. Diphenyl-t-dehydroabietinol.

5. Dimethyl-t-dehydroabietinol.

6. A method for making a tertiary rosin alcohol comprising reacting a primary rosin acid with a low molecular weight monohydric alcohol to form a rosin ester, treating the ester with a Grignard reagent selected from the class consisting of magnesium salts of unsubstituted primary alkyl halides of low molecular weight and magnesium salts of unsubstituted phenyl halides to form a magnesium halo-complex with the ester, and hydrolyzing said complex.

7. A method for making a tertiary rosin alcohol from an ester of a primary rosin acid formed with a low molecular weight monohydric alcohol, which method comprises treating the ester with a Grignard reagent selected from the class consisting of magnesium salts of unsubstituted primary alkyl halides of low molecular weight and magnesium salts of unsubstituted phenyl halides to form a magnesium halo-complex with the rosin ester, and hydrolyzing said complex.

8. A method according to claim 7 in which the Grignard reagent is a methyl magnesium halide.

9. A method according to claim 7 in which the Grignard reagent is a phenyl magnesium halide.

10. A method for making a tertiary rosin alcohol from an ester of a primary rosin acid formed with a low molecular weight alkyl alcohol, which method comprises treating the ester with a Grignard reagent selected from the class consisting of magnesium salts of unsubstituted primary alkyl halides of low molecular weight and magnesium salts of unsubstituted phenyl halides to form a magnesium halo-complex with the rosin ester, and hydrolyzing said complex.

HAROLD H. ZEISS.

REFERENCES CITED

The following references are of record in the file of this patent:

UNITED STATES PATENTS

| Number | Name | Date |
| --- | --- | --- |
| 2,359,826 | Campbell | Oct. 10, 1944 |

OTHER REFERENCES

Palkin, Jr.: Chemical Education, 1935, pp. 35–40.